July 25, 1933.  R. O. HELGEBY ET AL  1,919,512
SPUR GEAR SPEED ADAPTER
Filed Aug. 22, 1931

Inventors
Ralph O. Helgeby &
Donald D. Waller
by Blackmore, Spencer & Fluit
Attorneys Patented July 25, 1933

1,919,512

UNITED STATES PATENT OFFICE

RALPH O. HELGEBY AND DONALD D. WALLER, OF FLINT, MICHIGAN, ASSIGNORS TO A C SPARK PLUG COMPANY, OF FLINT, MICHIGAN, A COMPANY OF MICHIGAN

SPUR GEAR SPEED ADAPTER

Application filed August 22, 1931. Serial No. 558,644.

This invention relates to speed adapters and has particular reference to an adapter for installation in speedometer drives in automotive vehicles.

The adapter of the invention comprises two interfitting housing members or parts which confine the gears of the adapter therein. Each housing part has mounted therein a shaft which has a gear rigidly mounted thereon. A freely floating idler in the housing interconnects the two gears to form the drive. Each housing part has an elongated recessed portion in which there fits a slidable block having a central opening to receive a pin or shaft on which the idler gear is mounted. When the housing parts are separated, the idler gear and blocks readily may be removed. Referring to the drawing.

Figure 1:
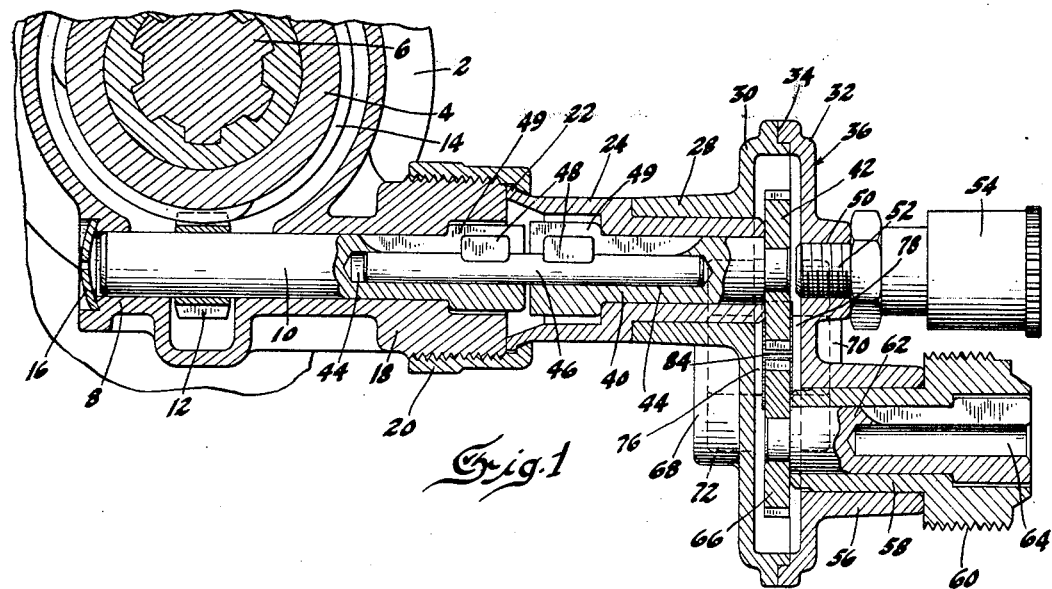
Fig. 1 is a sectional view of the speed adapter applied to the universal joint of the transmission shaft on an automotive vehicle.

Referring to the drawing, the numeral 2 indicates the housing of the universal joint 4 of the propeller shaft 6 of an automotive vehicle. The housing has the bearing portion 8 formed integral therewith in which bearing portion there is received the power take off shaft 10 having the gear wheel 12 secured thereto and meshing with the gear 14 on the universal joint. A suitable plug 16 closes the end of the bearing 8 opposite the shaft 10.

The bearing portion 8 has an extension 18 which is screw threaded and receives the internally threaded cap 20 held by means of an annular flange 22 on a bearing member 24 forming a part of the speed adapter. The bearing member 24 is rigidly secured in the extension 28 of the left hand housing half 30. A mating right hand housing half 32 fits onto the housing half 30 by means of the stepped connection indicated at 34. The housing halves 30 and 32 form the housing 36 of the speed adapter. The housing halves 30 and 32 are secured together by machine screws passing through the openings 38.

A shaft 40 is turnably mounted in the bearing sleeve 24 and has the gear wheel 42 rigidly secured at its end in the housing part 30. The shafts 10 and 40 are hollow as indicated at 44 and receive the connector 46 having the keys 48 fitting in keyways 49. Power is transmitted from the shaft 10 to the shaft 40 through the intermediary of the connector 46.

The housing half 36 is provided with a suitable opening 50 screw threaded to receive the nipple 52 of a grease cup 54. The purpose of the grease cup is to lubricate the gears in the housing 30.

The housing half 36 has the extension 56 in which there is mounted the bearing sleeve 58 screw threaded at its end as indicated at 60, to receive the connecting member of the casing of the flexible speedometer drive shaft. Turnably mounted in the bearing sleeve 58 is the shaft 62 having the hollow end 64 to receive the tip of the flexible cable. A gear 66 is permanently mounted on the end of the shaft 62 in the housing 36 and is positioned in the same plane as the gear 42.

The housing 30 has the extension 68, and the housing portion 32 has the extension 70, which mate or are oppositely positioned when the housing halves 30 and 32 are in position. The extensions 68 and 70 are recessed as indicated at 72 and 74 in Figs. 2 and 3 and in the recesses there are received the slidable blocks 76 and 78 each of which has the central opening 80 for the reception of the floating pin or shaft 82 on which there is mounted between the blocks 76 and 78 the floating idler gear 84. The blocks 76 and 78 are freely slidable in the recesses 72 and 74 and the gear 84 is freely turnable on the shaft 82 so that the gear 84 is a floating gear and freely may accommodate itself to slight inaccuracies or differences in the position of the gears 42 and 66.

Figure 2:
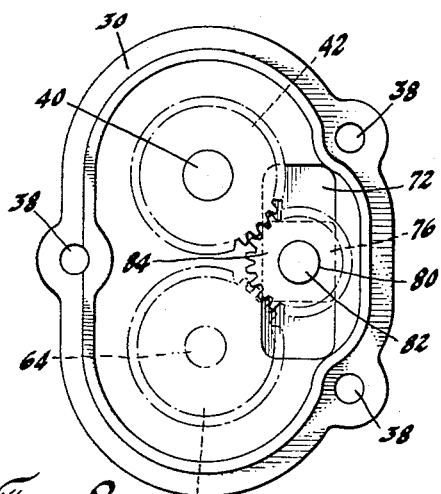
Fig. 2 is a sectional view looking into the left hand housing part of Fig. 1.
Figure 3:
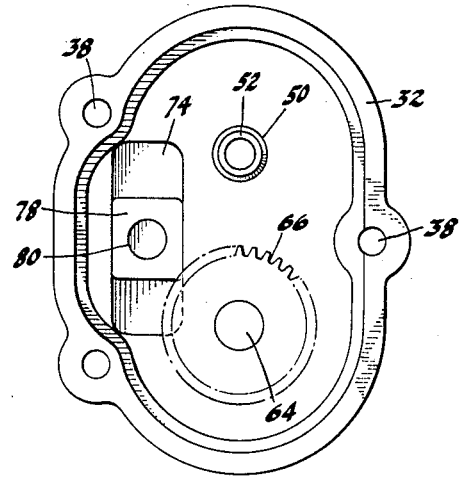
Fig. 3 is a view looking into the right hand housing part of Fig. 1.
Figure 4:
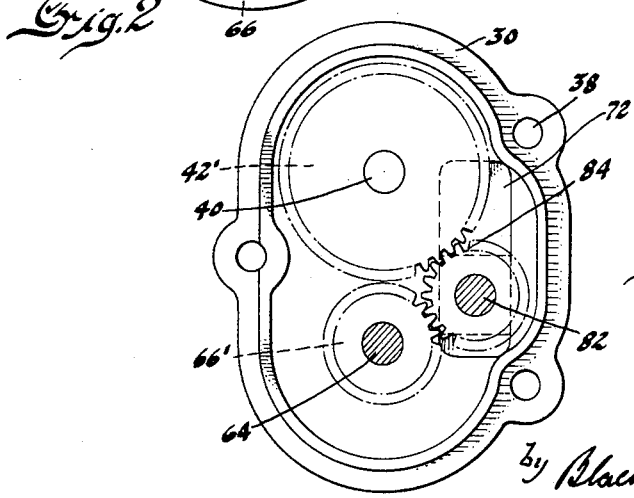
Fig. 4 is a view similar to Fig. 2 but showing a different ratio of gearing and showing the floating idler gear in its new position to accommodate the change in gearing.

Fig. 4 is in all respects similar to Fig. 2 except that the gears 42' and 66' have been changed to give a greater ratio therebetween. The gear 42' is larger than the gear 42, while the gear 66' is smaller than the gear 66.

The position of the shafts 40 and 64 remains unchanged but the idler 84 and its blocks 76 and 78 as well as the shaft 82 have moved downwardly to accommodate the change in gearing. The same idler may therefore be used with various ratios of gears to accommodate the adapter to variations in rotations of the shaft 6 or of the speedometer.

I claim:

1. In a speed adapter, a housing, a plurality of gears in the housing, shafts extending into the housing and each having the gear secured thereto, recessed portions in said housing, blocks slidable in said recessed portions, a gear between said blocks and meshing with the other gears, and a shaft passing through the gear and blocks.

2. In a speed adapter, a housing comprising two separable parts, shafts extending into and mounted in said parts, a gear on the end of each shaft in the housing, each part having a recessed portion, a block in each portion, a pin extending between the blocks, and an idler gear mounted on the pin between the blocks and interconnecting the other gears.

3. In a speed adapter, a housing comprising two separable parts, shafts extending into and mounted in said parts, a gear on the end of each shaft in the housing, each part having a recessed portion, a block slidable in each portion, a pin extending between the blocks, and a floating idler gear mounted on the pin between the blocks and interconnecting the other gears.

4. In a speed adapter, a housing, a plurality of gears, means for mounting the gears in said housing, a floating shaft mounted in said housing for straight line movement at right angles to the axes of the gear, and a gear mounted on said shaft and constantly interconnecting with said plurality of gears.

5. In a speed adapter, a housing, a plurality of gears, means for mounting the gears in said housing, a shaft, means to mount the shaft in the housing, said shaft mounting adapted to permit bodily movement of the shaft at right angles to the axes of the gears, and a gear mounted on said shaft and constantly interconnecting with said plurality of gears, the bodily movement of said shaft causing the last-named gear to adjust itself to the said plurality of gears.

RALPH O. HELGEBY.
DONALD D. WALLER.